(12) United States Patent
Wright et al.

(10) Patent No.: US 8,299,177 B2
(45) Date of Patent: Oct. 30, 2012

(54) COMPOSITIONS CONTAINING STYRENE-ISOBUTYLENE-STYRENE AND CONTROLLED DISTRIBUTION BLOCK COPOLYMERS

(75) Inventors: Kathryn J. Wright, Katy, TX (US); Sharman K. McGilbert, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 13/009,557

(22) Filed: Jan. 19, 2011

(65) Prior Publication Data

US 2011/0184082 A1   Jul. 28, 2011

Related U.S. Application Data

(60) Provisional application No. 61/298,749, filed on Jan. 27, 2010.

(51) Int. Cl.
*C08F 12/08* (2006.01)
*C08L 53/02* (2006.01)

(52) U.S. Cl. .......................................... 525/89
(58) Field of Classification Search ............... 525/89
See application file for complete search history.

(56) References Cited

U.S. PATENT DOCUMENTS

| | | |
|---|---|---|
| 3,149,182 A | 9/1964 | Porter |
| 3,494,949 A | 2/1970 | Monroe |
| RE27,145 E | 6/1971 | Jones |
| 3,595,942 A | 7/1971 | Wald |
| 3,634,594 A | 1/1972 | Hiyama |
| 3,670,054 A | 6/1972 | De La Mare et al. |
| 4,578,429 A | 3/1986 | Gergen et al. |
| 4,898,914 A | 2/1990 | Gergen et al. |
| 4,970,265 A | 11/1990 | Willis |
| 5,206,300 A | 4/1993 | Chamberlain |
| 5,276,101 A | 1/1994 | Chamberlain et al. |
| 5,506,299 A | 4/1996 | Gelles et al. |
| 5,516,831 A | 5/1996 | Pottick et al. |
| 6,008,294 A | 12/1999 | Bonekamp et al. |
| 6,664,359 B1 | 12/2003 | Kangas et al. |
| 6,910,507 B2 | 6/2005 | Simon et al. |
| 7,056,971 B2 | 6/2006 | Varma |
| 7,169,848 B2 | 1/2007 | Bening et al. |
| 2005/0101693 A1 * | 5/2005 | Arbogast et al. .............. 523/122 |
| 2006/0088350 A1 | 4/2006 | Imamiya |
| 2006/0229402 A1 | 10/2006 | Varma |
| 2008/0015306 A1 | 1/2008 | Wright et al. |
| 2008/0115825 A1 | 5/2008 | Patel et al. |
| 2009/0030171 A1 | 1/2009 | Leenders et al. |

OTHER PUBLICATIONS

F.A. Bovey, High Resolution NMR of Macromolecules, Academic Press, New York and London, 1972, Chapter 6.
J.J. Aklonis and W.J. Macknight, Introduction to Polymer Viscoelasticity, 2nd Ed., John Wiley & Sons, NY 1983, p. 18-19.
S. Pauly, Permeability and Diffusion Data, Polymer Handbook 3rd Ed. Eds. J. Brandup, John Wiley & Sons, 1989, p. VI/442.
PCT International Search Report for PCT/US 11/21609, filed Jan. 19, 2011.

* cited by examiner

*Primary Examiner* — Jeffrey Mullis
(74) *Attorney, Agent, or Firm* — Clements Bernard PLLC; Michael A. Masse

(57) ABSTRACT

The present invention provides for a composition that includes a hydrogenated styrenic block copolymer that has at least one block A and at least one block B, and about 10 to about 90 percent by weight of an styrene-isobutylene-styrene block copolymer. Each A is an monoalkenyl arene and each B block is a controlled distribution copolymer of at least one mono alkenyl arene and at least one conjugated diene, having the general formula A-EB/A-A and (A-EB/A)nX. Each B block comprises terminal regions adjacent to the A blocks that are rich in conjugated diene units and one or more regions not adjacent to the A blocks that are rich in mono alkenyl arene units. Oil-free compositions that result in the combination of low gaseous permeability, low thermal conductivity, strong vibration and sound attenuation, and optionally high levels of light transmission with relatively low haze values while maintaining melt flow rates suitable for easy processability are preferred.

27 Claims, 1 Drawing Sheet

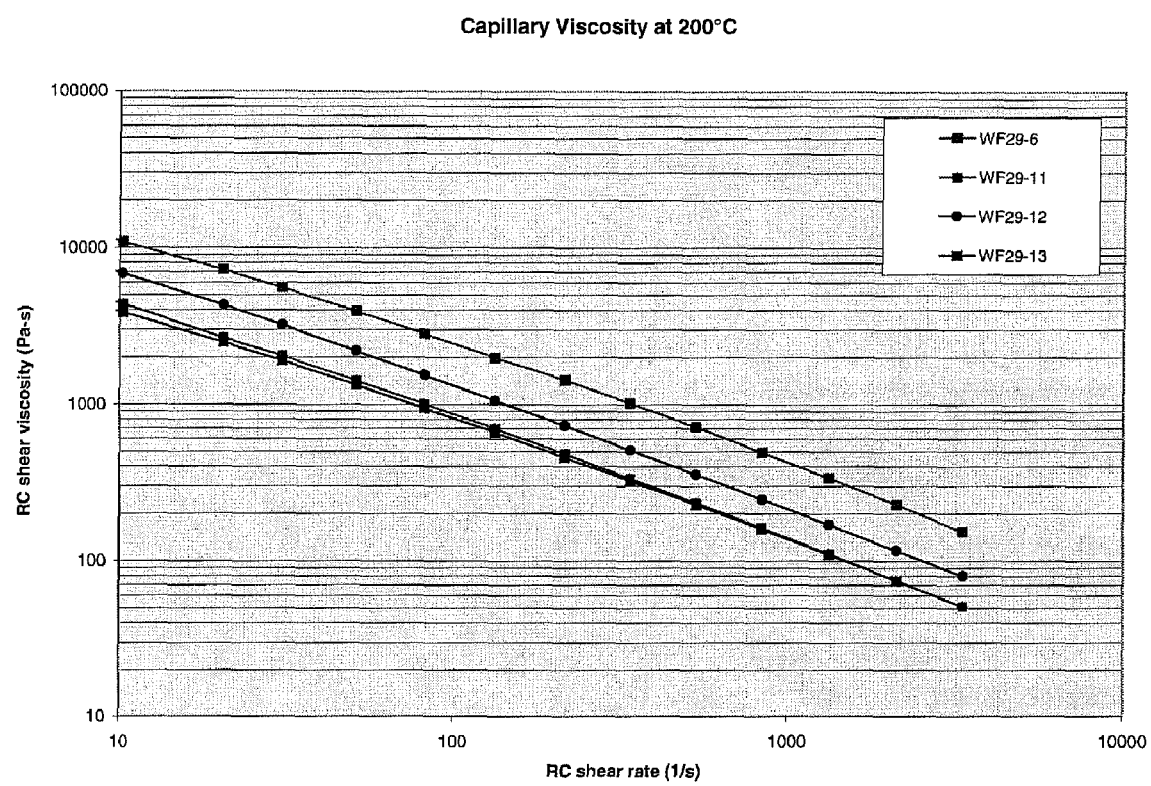

ically transparent com- positions which is not possible in the prior art. Optically transparent compositions are possible when the refractive indices of the blend of polymers have about the same value. For the present invention, that means the refractive index of all components should be about 1.53+/−0.03.

COMPOSITIONS CONTAINING STYRENE-ISOBUTYLENE-STYRENE AND CONTROLLED DISTRIBUTION BLOCK COPOLYMERS

FIELD OF THE INVENTION

The present invention relates generally to novel compositions comprising (1) controlled distribution block copolymers of monoalkenyl arenes and conjugated dienes having the general formula A-EB/A-A and/or (A-EB/A)nX, and (2) styrene-isobutylene-styrene block copolymers (SiBS) that result in the combination of low gaseous permeability, low thermal conductivity, strong vibration and sound attenuation, and optionally high levels of light transmission with relatively low haze values while maintaining melt flow rates suitable for easy processability.

BACKGROUND OF THE INVENTION

The preparation of block copolymers of mono alkenyl arenes and conjugated dienes is well known. One of the first patents on linear ABA block copolymers made with styrene and butadiene is U.S. Pat. No. 3,149,182. These polymers in turn could be hydrogenated to form more stable block copolymers, such as those described in U.S. Pat. No. 3,595,942 and U.S. Pat. No. Re. 27,145. Since then, a large number of new styrene diene polymers have been developed.

BRIEF SUMMARY OF THE INVENTION

The particular compositions of the present invention are blends of a styrene-isobutylene-styrene block copolymer (SiBS) and a controlled distribution block copolymer of monoalkenyl arenes and conjugated dienes. In particular the controlled distribution block copolymer is A-EB/A-A and/or (A-EB/A)nX. It has been shown that this preferably oil-free combination contains unique characteristics such as low gaseous permeability, low thermal conductivity, strong vibration and sound attenuation, and optionally high levels of light transmission with relatively low haze values while maintaining melt flow rates suitable for easy processability. Moreover this particular combination is also particularly suitable with blends of other polymers, and especially with polyolefin polymers, and most preferably with polypropylene.

BRIEF DESCRIPTION OF THE DRAWING

The FIGURE is a flow chart of Capillary Viscosity at 200° C for various bends set forth in Table 10.

DETAILED DESCRIPTION OF THE INVENTION

Varma has previously shown the combination of styrene-ethylene/butylene-styrene (SEBS) block copolymers with styrene-isobutylene-styrene (SiBS) block copolymers result in unique characteristics in US 2006/0229402 A1 which is hereby incorporated by reference. Varma requires the use of a plasticizer, such as processing oil, to enhance processability. The compositions of the present invention are unique in that they do not require the use of a plasticizer due to the incorporation of controlled distribution block copolymers such as S-EB/S-S or (S-EB/S)nX, which impart good processability. In addition the controlled distribution block copolymers, such as S-EB/S-S or (S-EB/S)nX, unexpectedly have similar refractive index to that of the styrene-isobutylene-styrene block copolymers which results in optically transparent com- The particular compositions of the present invention are preferably oil-free blends of a (1) controlled distribution block copolymer and (2) styrene-isobutylene-styrene block copolymer. It has been found that blends of controlled distribution block copolymers, such as, for example, S-EB/S-S or (S-EB/S)nX, are unique in that the resultant composition demonstrates good processability while achieving high levels of light transmittance and relatively low haze values. These compositions can be further blended with plastics with refractive index of about 1.53 to maintain optical clarity. Polyolefins can also be incorporated if optical clarity is not a requirement for the final end use.

The controlled distribution block copolymer is A-EB/A-A and/or (A-EB/A)nX. The "A" block is alkenyl arene, which can be selected from styrene, alpha-methylstyrene, para-methylstyrene, vinyl toluene, vinylnaphthalene, and para-butyl styrene or mixtures thereof. The "B" block is a controlled distribution copolymer of at least one mono alkenyl arene with at least one conjugated diene, which can be selected from 1,3-butadiene and substituted butadienes such as isoprene, piperylene, 2,3-dimethyl-1,3-butadiene, and 1-phenyl-1,3-butadiene, or mixtures thereof. In the above formulas, "E" means the diene has been hydrogenated and when you hydrogenate butadiene, it becomes ethylene butylene (EB). Likewise for hydrogenated isoprene, it becomes isoprene propylene, normally written as IP, but because of the many acceptable conjugated dienes useful in the present invention, "E" merely means the diene has been hydrogenated to at least 80 wt. % and preferably at least 85 wt. % and most preferably at least 90 wt. %.

In one embodiment, the present invention provides an oil-free composition comprising:

(1) a hydrogenated block copolymer that has at least one block A and at least one block B, and wherein:
  a. prior to hydrogenation each A block is a mono alkenyl arene homopolymer block and each B block is a controlled distribution copolymer block of at least one conjugated diene and at least one mono alkenyl arene;
  b. subsequent to hydrogenation about 0-10% of the arene double bonds have been reduced, and at least about 90% of the conjugated diene double bonds have been reduced;
  c. each A block having a number average molecular weight between about 3,000 and about 60,000 and each B block having a number average molecular weight between about 30,000 and about 300,000;
  d. each B block comprises terminal regions adjacent to the A blocks that are rich in conjugated diene units and one or more regions not adjacent to the A blocks that are rich in mono alkenyl arene units;
  e. the total amount of mono alkenyl arene in the hydrogenated block copolymer is about 20 percent weight to about 80 percent weight; and
  f. the weight percent of mono alkenyl arene in each B block is between about 10 percent and about 75 percent; and
(2) about 10 to about 90 percent by weight of an styrene-isobutylene-styrene block copolymer;
  wherein the total wt. % of the composition is 100 wt. %, wherein the composition has a light transmittance between about 70 to about 90% transmission, including all points in-between, according to ASTM D1003, and a haze between about 5 to about 50%, including all points in-between, according to ASTM D1003.

While an oil-free composition is much preferred, it is possible to incorporate processing oil while maintaining good optical transparency. According to another embodiment of the present invention, the present invention provides composition of (1) a hydrogenated block copolymer that has at least one block A and at least one block B, and wherein:

a. prior to hydrogenation each A block is a mono alkenyl arene homopolymer block and each B block is a controlled distribution copolymer block of at least one conjugated diene and at least one mono alkenyl arene;

b. subsequent to hydrogenation about 0-10% of the arene double bonds have been reduced, and at least about 90% of the conjugated diene double bonds have been reduced;

c. each A block having a number average molecular weight between about 3,000 and about 60,000 and each B block having a number average molecular weight between about 30,000 and about 300,000;

d. each B block comprises terminal regions adjacent to the A blocks that are rich in conjugated diene units and one or more regions not adjacent to the A blocks that are rich in mono alkenyl arene units;

e. the total amount of mono alkenyl arene in the hydrogenated block copolymer is about 20 percent weight to about 80 percent weight; and f. the weight percent of mono alkenyl arene in each B block is between about 10 percent and about 75 percent;

(2) about 10 to about 90 percent by weight of an styrene-isobutylene-styrene block copolymer; and (3) about 5 to about 40 percent by weight of an oil;

wherein the total wt. % of the composition is 100 wt. %, wherein the composition has a light transmittance between about 70 to about 90% transmission, including all points in-between, according to ASTM D1003, and a haze between about 5 to about 50%, including all points in-between, according to ASTM D1003.

According to yet another embodiment of the present invention, the present invention provides a composition of (1) a hydrogenated block copolymer that has at least one block A and at least one block B, and wherein:

a. prior to hydrogenation each A block is a mono alkenyl arene homopolymer block and each B block is a controlled distribution copolymer block of at least one conjugated diene and at least one mono alkenyl arene;

b. subsequent to hydrogenation about 0-10% of the arene double bonds have been reduced, and at least about 90% of the conjugated diene double bonds have been reduced;

c. each A block having a number average molecular weight between about 3,000 and about 60,000 and each B block having a number average molecular weight between about 30,000 and about 300,000;

d. each B block comprises terminal regions adjacent to the A blocks that are rich in conjugated diene units and one or more regions not adjacent to the A blocks that are rich in mono alkenyl arene units;

e. the total amount of mono alkenyl arene in the hydrogenated block copolymer is about 20 percent weight to about 80 percent weight; and f. the weight percent of mono alkenyl arene in each B block is between about 10 percent and about 75 percent;

(2) about 10 to about 90 percent by weight of an styrene-isobutylene-styrene block copolymer;

(3) about 0 to about 40 percent by weight of an oil; and (4) about 2 to about 40 percent by weight of engineering thermoplastics;

wherein the total wt. % of the composition is 100 wt. %, wherein the composition has a light transmittance between about 60 to about 90% transmission, including all points in-between, according to ASTM D1003, and a haze between about 5 to about 60%, including all points in-between, according to ASTM D1003.

Optical clarity may not be necessary for the final end use application. As such, it may be appropriate to incorporate a polyolefin or styrenic resin. According to yet another embodiment of the present invention, the present invention provides a composition of (1) a hydrogenated block copolymer that has at least one block A and at least one block B, and wherein:

a. prior to hydrogenation each A block is a mono alkenyl arene homopolymer block and each B block is a controlled distribution copolymer block of at least one conjugated diene and at least one mono alkenyl arene;

b. subsequent to hydrogenation about 0-10% of the arene double bonds have been reduced, and at least about 90% of the conjugated diene double bonds have been reduced;

c. each A block having a number average molecular weight between about 3,000 and about 60,000 and each B block having a number average molecular weight between about 30,000 and about 300,000;

d. each B block comprises terminal regions adjacent to the A blocks that are rich in conjugated diene units and one or more regions not adjacent to the A blocks that are rich in mono alkenyl arene units;

e. the total amount of mono alkenyl arene in the hydrogenated block copolymer is about 20 percent weight to about 80 percent weight; and f. the weight percent of mono alkenyl arene in each B block is between about 10 percent and about 75 percent;

(2) about 10 to about 90 percent by weight of an styrene-isobutylene-styrene block copolymer;

(3) about 0 to about 40 percent by weight of an oil; and (4) about 5 to about 30 percent by weight of a polyolefin or styrenic resin;

wherein the total wt. % of the composition is 100 wt. %, wherein the composition has an oxygen permeability coefficient $<0.9\times10^{-12}$ (cc×cm)/(cm$^2$×s×Pa) as measured at 23° C. and 0% relative humidity with 100% O$_2$ test gas concentration and 760 mmHg test gas pressure.

Controlled Distribution Block Copolymer

The controlled distribution block copolymer of the present invention have been described in detail by Bening, et al. in U.S. Pat. No. 7,169,848 which is incorporated by reference. The controlled distribution block copolymer of the present invention contains mono alkenyl arene end blocks and a unique mid block of a mono alkenyl arene, and a conjugated diene. Surprisingly, the combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., have a greater than average amount of) conjugated diene units; (2) one or more regions not adjacent to the A blocks that are rich in (i.e., have a greater than average amount of) mono alkenyl arene units; and (3) an overall structure having relatively low blockiness. For the purposes hereof, "rich in" is defined as greater than the average amount, preferably greater than 5 wt. % above the average amount. This relatively low blockiness can be shown by either the presence of only a single ("Tg,") intermediate between the Tg's of either monomer alone, when analyzed using differential scanning calorimetry ("DSC") (thermal) methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows.

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), Chapter 6.

The styrene blockiness is simply the percentage of blocky styrene to total styrene units:

Blocky %=100 times(Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately constituted controlled distribution copolymer region will tend to improve flow and processability. Modification of certain other properties is also achievable.

In a preferred embodiment of the present invention, the subject controlled distribution copolymer block has three distinct regions—conjugated diene rich regions on the end of the block and a mono alkenyl arene rich region near the middle or center of the block. Typically the region adjacent to the A block comprises the first 15 to 25%, and all points in-between, of the block and comprises the diene rich region(s), with the remainder considered to be arene rich. The term "diene rich" means that the region has a measurably higher ratio of diene to arene than the arene rich region. What is desired is a mono alkenyl arene/conjugated diene controlled distribution copolymer block, wherein the proportion of mono alkenyl arene units increases gradually to a maximum near the middle or center of the block (when describing an ABA structure) and then decreases gradually until the polymer block is fully polymerized. This structure is distinct and different from the tapered and/or random structures discussed in the prior art.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

As used herein, "thermoplastic block copolymer" is defined as a block copolymer having at least a first block of a mono alkenyl arene, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as endblocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to faun the terminal block. In addition to the linear, A-B-A configuration, the blocks can be structured to form a radial (branched) polymer, $(A-B)_nX$ or $(A-B-A)_nX$, or both types of structures can be combined in a mixture. Some A-B diblock polymer can be present but preferably at least about 70 weight percent of the block copolymer is A-B-A or radial (or otherwise branched so as to have 2 or more terminal resinous blocks per molecule) so as to impart strength. Other structures include $(A-B)_n$ and $(A-B)_nA$. In the above formulas, n is an integer from 2 to about 30, preferably 2 to about 15, more preferably 2 to 6 and X is the remnant or residue of the coupling agent.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2X$ block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. These molecular weights are most accurately determined by light scattering measurements, and are expressed as true number average molecular weights.

Another important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis, preferably about 30 to about 80 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

For the controlled distribution or B block the weight percent of mono alkenyl arene in each B block is between about 10 weight percent and about 75 weight percent, preferably between about 25 weight percent and about 50 weight percent.

An important feature of the thermoplastic elastomeric di-block and tri-block polymers of the present invention, including one or more controlled distribution diene/alkenyl arene copolymer blocks and one or more mono alkenyl arene blocks, is that they have at least two Tg's, the lower being the single Tg of the controlled distribution copolymer block which is an intermediate of its constituent monomers' Tg's. Such Tg is preferably at least above about −60° C., more preferably from about −40° C. to about +30° C., and most preferably from about −40° C. to about +10° C. The second Tg, that of the mono alkenyl arene "glassy" block, is preferably more than about +80° C., more preferably from about +80° C. to about +110° C. The presence of the two Tg's, illustrative of the microphase separation of the blocks, contributes to the notable elasticity and strength of the material in a wide variety of applications, and its ease of processing and desirable melt-flow characteristics.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and U.S. Pat. No. Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds are reduced, and more preferably about 98 percent of the conjugated diene double bonds are reduced.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831.

The controlled distribution block copolymer of the present invention may include the copolymer sold under the trade name Kraton A® by Kraton Polymers.

SiBS

A styrene-isobutylene-styrene (SiBS) block copolymer is combined with the aforementioned controlled distribution block copolymer to form a formulation with the combination of low gaseous permeability, low thermal conductivity, strong vibration and sound attenuation, and optionally high levels of light transmission with relatively low haze values while maintaining melt flow rates suitable for easy processability. The SiBS block copolymer has a number average molecular weight in the range from about 50,000 to about 500,000 with the weight ratio of styrene to isobutylene ranging from 5/95 to 40/60. The SiBS preferably has a hardness in the range from Shore A 20-100, tensile at 100% elongation in the range from about 0.5 to 10 MPa and specific gravity in the range from 0.9 to 0.99. The SiBS block copolymer used in the present invention is sold under the trade name SIBSTAR® by Kaneka. The SiBS and controlled distribution block copolymer formulations contain SiBS in the amount of about 10 to about 90% by weight, including all points in-between.

Extender Oil

While oil-free compositions are preferred, the composition of the present invention also optionally contains a non-polar extender oil in an amount from 0 to 200 phr relative to the sum of SiBS and the controlled distribution block copolymer. Non-polar extender oils are well-known in the art and include both high saturates content oils and high aromatic content oils. Preferred extender oils are highly saturated oils, e.g. mineral oils, both naphthenic and paraffinic oils, or low molecular weight polymers such as polyisobutylene, or hydrogenated copolymers of butadiene and/or styrene. Examples of suitable extender oils include, but are not limited to, RENOIL 371 (a naphthenic oil commercially available from Renkert Oil), TUFFLO 6056 (a white mineral oil commercially available from Lyondell Lubricants), DRAKEOL 34 (paraffinic oil commercially available from Calumet Specialty Products) and KAYDOL Oil (a white mineral oil commercially available from Sonneborn). RENOIL, TUFFLO, DRAKEOL and KAYDOL are trademarks. The amount of non-polar extender oil used in the present invention is preferably in the range from 0 phr to 200 phr, more preferably from 0 phr to 100 phr, and most preferably from about 0 phr to about 50 phr. Extender oils which may be used in the composition should be capable of being processed with the other components of the composition without degrading. Suitable vegetable oils (Rapeseed oil for example) and animal oils and/or their derivatives may also be used as the non-polar extender oil.

Tackifying Resin

The present invention also optionally contains aliphatic tackifying resins which may be compatible with the polystyrene endblock or the midblock (rubbery block). The polystyrene block compatible resins and the midblock compatible resins may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosin esters, rosin derivatives and mixtures thereof. Examples of these resins are sold under the trademarks Regalrez, Arkon, and Oppera. The amount of cyclic aliphatic tackifying resin is from about 0 to about 25 wt. % of the total weight of the elastomeric compound.

The term "melt index" is a measure of the melt flow of the block copolymer composition according ASTM D1238 at 230° C. and 5 kg weight. It is expressed in units of grams of polymer passing through a melt rheometer orifice in 10 minutes. In one embodiment, the block copolymers of Kraton® A and SIBSTAR® have a melt flow rate range between 2-50 which is suitable for processes ranging from extrusion and injection molding to fiber spinning. However, when a polyolefin or engineering thermoplastic (described below) is combined with Kraton® A and SIBSTAR® in another embodiment of the present invention, the melt index is from about 1 to about 100, preferably from about 1 to about 50, and more preferably from about 3 to about 50, including all points in-between.

Stabilizers

Stabilizers known in the art may also be incorporated into the composition. The stabilizers are for protection during the life of the finished product against, for example, oxygen, ozone and ultra-violet radiation. These may also be for stabilization against thermo-oxidative degradation during elevated temperature processing. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than 1 phr.

Combinations of primary and secondary antioxidants may be used. Such combinations include sterically hindered phenolics with phosphites or thioethers, such as hydroxyphenyl-propionates with aryl phosphates or thio ethers, or amino phenols with aryl phosphates. Specific examples of useful antioxidant combinations include, but are not limited to, 3-(3, 5-di-t-butyl-4-hydroxyphenyl)-propionate)methane (IRGANOX 1010, commercially available from BASF) with tris (nonyl-phenyl)phosphite (POLYGARD FIR, commercially available from Uniroyal), IRGANOX 1010 with bis(2,4-di-t-butyl)pentaerythritol diphosphite (ULTRANOX 626, commercially available from Chemtura) and IRGANOX 1010 with dilauryl-3,3'-thiodiproprionate (DLTDP, commercially available from BASF). Antioxidants that act as bases generally should be avoided. IRGANOX, ULTRANOX and POLYGARD are trademarks. The Examples of the present invention utilize Ethanox 330, Irgafos® 168, and Genox® EP.

Combinations of primary antioxidants and UV stabilizers may also be used. Such combinations included sterically hindered phenolics with benzothiazole or piperidinyl compounds. Specific examples useful as stabilizers in the present invention are IRGANOX 1010 with 2-(2-hydroxy-3,5-di-tert-amylphenyl)benzotriazole (TINUVIN 328, commercially available from BASF) and IRGANOX 1010 with bis (1,2,2,6,6-pentamethyl-4-piperidinyl)sebecate (TINUVIN 765, commercially available from BASF) and the ternary combination of IRGANOX 1010 with TINUVIN 328 and with TINUVIN 765. TINUVIN is a trademark.

Engineering Thermoplastics

The block copolymer composition may also comprise minor amounts of engineering thermoplastics in an amount from about 2 to about 35 percent by weight. One advantage of both SIBSTAR® and Kraton A® polymers is that they have a similar refractive indices of about 1.53 which facilitates blending with various engineering thermoplastics with a refractive index of about 1.53 so that a transparent product can be achieved. Examples of appropriate engineering thermoplastics include, but are not limited to, cyclic-olefin copolymers (Ticona Topas 6015), amorphous Nylons (DuPont Zytel 330 NC010), MMA-SAN (Blendex 866), Methacrylate-Acrylonitrile-styrene (Cyclolac GRM5300), Acrylonitrile-Butadiene-Styrene (GE Specialty Chemicals, Kaneka KANE ACE), and thermoplastic polyurethanes (TPUs) such as Estane 58300 from Lubrizol Advanced Materials and has a refractive index of 1.527.

The engineered thermoplastics may be added to compositions of the present invention preferably comprising Kraton A and SIBSTAR®.

Refractive index matching is a known technique to mix multiple polymeric materials in order to achieve a transparent product. The ability to match the refractive indices results in transparent formulations to be made over a wide hardness range, while improving upper service temperature performance of the controlled distribution block copolymer and styrene-isobutylene-styrene composition of the present invention. Refractive indices within 0.03 units are considered "matched".

The compositions of the present invention that are modified with engineering thermoplastics that have surprisingly and unexpected low gaseous permeability coefficients. The combination of transparency with low $CO_2$ and $O_2$ permeability coefficients is important for gas impermeable sealants, among others. Compositions of the present invention that are combined with a engineered thermoplastic, such as a cyclic-olefin copolymer (Topas 6013), unexpectedly have even lower $CO_2$ permeability coefficient of about 0.5 to about 1. Compositions of the present invention that do not contain engineering thermoplastics have a $CO_2$ permeability of about 1 to about 1.5. Compositions of the present invention that are combined with a engineered thermoplastic, such as a cyclic-olefin copolymer (Topas 6013), have a $O_2$ permeability coefficient of about 0.1 to about 0.2. Compositions of the present invention that do not contain engineering thermoplastics have a $O_2$ permeability of about 0.2 to about 0.8. All permeability coefficients are in the units $1^{-12}$ (cc×cm)/(cm²×s×Pa)

Polyolefins and Styrenic Resins

The block copolymer composition may also comprise minor amounts of polyolefins or styrenic resins when optical clarity is not a required feature for the end use application. The polyolefin and/or styrenic resin may be present in an amount from about 5 to about 25% of the total composition.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EAA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Still other polymers included hereunder are polyvinyl chloride (PVC) and blends of PVC with other materials. The amount of olefin polymer employed varies from about 5 to about 100 parts by weight per hundred parts by weight rubber, or block copolymer, preferably about 20 to about 50 parts by weight.

Slip Agents and Other Additives

Slip agents may be incorporated into the present invention serve to enhance the processability of the composition and reduce the fiber stickiness. As such, high extrusion rates and spinning speeds are achievable. Suitable slip agents include low molecular weight amides, metallic stearates such as calcium and zinc stearates and the like, silicones, fluorinated hydrocarbons, acrylics and silicones, waxes and the like. Examples of suitable primary amides are behanamide (available as Crodamide BR from Croda, and ARMOSLIP® B from Akzo Nobel), erucamide (available as Crodamide E from Croda, ARMOSLIP E from Akzo Nobel, Kemamide E from Chemtura, and ATMER® SA 1753 from Uniqema), oleamide (available as Crodamide VRX from Croda, ARMOSLIP CP from Akzo Nobel, and ATMER SA 1758 from Uniqema), and stearamide (available as Crodamide SR from Croda, ARMOSLIP 18 LF from Akzo Nobel, and ATMER SA 1750 from Uniqema). Examples of suitable secondary amines are oleyl palitamide (available as Crodamide 203 from Croda) and stearyl erucamide (available as Crodamide 212 from Croda). Both saturated and unsaturated amides are suitable. The block copolymer composition may include other additives intended for specific purposes such as a decolorizer to further reduce haze and improve transparency. A suitable decolorizer is decolorizer 6015 produced by Clariant®. Other additives such as endothermic or exothermic blowing agents for the production of foamed articles may also be included in the composition. The slip agents and additive are preferably used in an amount ranging from 0.01 to 5.0 weight percent of the total composition.

Optional Fillers

Suitable fillers may also be incorporated into the composition of the present invention when optical clarity is not required for the final end use application. Examples of suitable fillers include talc, calcium carbonate, carbon black, fly ash, slate dust, limestone, dolomite and siliceous fillers, such as clay, mica and other sheet silicates. Mixtures of different fillers may be used. Preferably, calcium carbonate or talc are used as fillers. The amount of filler is preferably from 0% by weight to suitably less than 80% by weight based on total weight of the block copolymer composition and filler.

Compositions composed of the controlled distribution block copolymer, styrene-isobutylene-styrene block copolymer, and optionally an extender oil of the present invention result in transparent materials as shown by high levels of light transmission and relatively low haze values. These compositions have a light transmittance between about 70 to about 90% transmission, including all points in-between, according to ASTM D1003, and a haze between about 10 to about 50%, including all points in-between, according to ASTM D1003. The compositions have a Shore A hardness between about 20 to about 95, including all points in-between, according ASTM D2240.

The compositions of the present invention demonstrated unexpected and surprising improved vibration damping and sound abatement behavior as demonstrated through dynamic mechanical analysis. The ability for an elastic material to dissipate vibration is indicated by the magnitude and breadth of its tan delta response. Tan delta is the ration of loss modulus vs storage modulus. [J. J. Aklonis & W. J. MacKnight, *Introduction to Polymer Viscoelasticity* $2^{nd}$ Edition, John Wiley & Sons, NY, 1983, p 18]. The composition of the present invention has tan delta values of between about 0.90 to about 1.5, including all points in-between. More preferably, the tan delta values are approximately >1. This tan delta value combined with a very broad tan delta response as indicated by these compositions results in a composition with excellent vibration and sound dissipation.

The compositions of the present invention exhibit low thermal conductivity. Low thermal conductivity is defined by thermal conductivities measuring about 0.14 W/mK. Heat insulating activities require a low thermal conductivity, and the compositions of the present invention will be beneficial in these applications, among others. The compositions of the present invention exhibit a thermal conductivity of between about 0.13 and about 0.15 W/m*K according to ASTM C518.

Regarding the relative amounts of the various ingredients, this will depend in part upon the particular end use. The polymer of the present invention maybe used in a large number of applications. The following various end uses and/or processes are meant to be illustrative, and not limiting to the present invention:

General Injection Molded Goods, such as re-coil pads for firearms and bow stabilizers for archery, cushions and gels, floor mats, shock relief pads and grips (shoe inserts, golf club grips, impact reduction gloves), energy absorbing foams, and shock absorbers.

Extruded Goods, such as laminate floor or carpet underlayment, wine corks, bottle cap liners, energy absorbing foams and gels, thermal insulative pipe wrap, protective films, and elastic film.

Industrial such as view windows in acoustical curtain enclosures, strip doors to allow access into acoustical curtain enclosures, acoustical pipe wrap, duct lagging and other HVAC applications, and deadening spunbond or melt blown nonwoven or staple fibers for sound and vibration abatement application. One example of such an application is protection of glass composites or glass filtration media.

Medical such as medical tubing, mannequin skins, and medical stoppers.

EXAMPLES

The following examples are provided to illustrate the present invention. The examples are not intended to limit the scope of the present invention and they should not be so interpreted.

The following components were used in the example.

Example 1

Oil-Free Binary Blends with Good Transparency

Blends of SIBSTAR and various controlled distribution Kraton A polymers (A1536 and Polymer 1) were prepared by blending the components in a Berstorff 25-mm diameter co-rotating twin screw extruder (low shear D screw) with melt temperatures between 210° C. and 230° C. A Gala underwater pelletizer was used to produce pellets, and the pellets were then dried under a $N_2$ purge for 48 hours. With the aid of a Krauss-Maffei injection molding machine test specimens were produced.

The data produced below indicates the blends of SIBSTAR and Kraton A (WF27-2 and WF27-7) result in transparent materials as shown by high levels of light transmission and relatively low haze values. Formulation WF27-5 is a control formulations based on SIBSTAR blended with a traditional SEBS polymer (Kraton G1650) and result in poor transparency. A wide range of melt flow indices can be achieved based on the molecular weight of the Kraton A polymer. Optical properties such as haze and transmission were measured on injection molded disks at 0.125 inch thick according to ASTM D-1003. Melt flow rate is measured on dried compound pellets at 230 C/5 kg. Hardness is tested according to ASTM D2240 and tensile properties are measured according to ASTM D-412.

Polymer 1 is a controlled distribution block copolymer produced according to the methods described in Bening et. al. under U.S. Pat. No. 7,169,848 and is of the (S-EB/s)nX type coupled with methyltrimethoxysilane. Its molecular weights are S=7.3 kg/mol, EB/s=45.5 kg/mol. Polymer 1 has an overall polystyrene content of 34.1% and a midblock polystyrene content of 22.0%. The ratio of 1,2 Bd to 1,4 Bd in the EB/s midblock is 68%:32%. Polymer 1 has a midblock blockiness index of 0 and a midblock Tg of 9° C. See Table 1

TABLE 1

| | Unit | WF27-2 | Comparative WF27-5 | WF27-7 |
|---|---|---|---|---|
| Formulation | | | | |
| SIBSTAR 073T | | — | — | — |
| SIBSTAR 102T | | 100 | 100 | 100 |
| Kraton A1536 | | 100 | — | — |
| Kraton G1650 | | — | 100 | — |
| Polymer 1 | | — | — | 100 |
| Drakeol 34 | | — | — | — |
| Kemamide E | | — | — | — |
| AO330 | | 0.1 | 0.1 | 0.1 |

TABLE 1-continued

| | Unit | WF27-2 | Comparative WF27-5 | WF27-7 |
|---|---|---|---|---|
| Irgafos 168 | | 0.2 | 0.2 | 0.2 |
| Irganox 1010 | | — | — | — |
| DLTDP | | — | — | — |
| Properties Measured | | | | |
| MFI | | | | |
| 230 C./5 kg | g/10 min | 3.2 | 1 | 29 |
| Physical Properties | | | | |
| Shore A Hardness | 10 s | 53 | 55 | 37 |
| Tensile Strength, MD | psi | >1270 | >1050 | — |
| Tensile Strength, TD | psi | >540 | >540 | — |
| Elongation, MD | % | >450 | >470 | — |
| Elongation, TD | % | >420 | >440 | — |
| 300% Modulus, MD | psi | 610 | 550 | — |
| 300% Modulus, TD | psi | 280 | 260 | — |
| Optical Properties | | | | |
| Light Transmission | % | 86 | 69 | 78 |
| Haze | % | 11 | 99 | 45 |

Example 2

Oil Extended Blends with Good Transparency

The Examples were prepared by combining the non-polar extending oil DRAKEOL 34 with Kraton® A1536. The mixture of DRAKEOL 34 and A1536 were shaken until the oil was fully absorbed by the A1536. SIBSTAR® 073T and Kemamide E were added to the mixture of A1536 and DRAKEOL 34. These ingredients were shaken to form a homogenous mixture. The samples were prepared by blending the components in a Berstorff 25-mm diameter co-rotating twin screw extruder and a Gala underwater pelletizer were used to produce pellets. The pellets were then dried under a $N_2$ purge for 48 hours. With the aid of a Krauss-Maffei injection molding machine test specimens were produced.

The data produced below (Blend B) indicates that blends of SIBSTAR and Kraton A can be effectively blended with processing oil as desired to result in transparent materials as shown by high levels of light transmission and relatively low haze values. A wide range of melt flow indices can be achieved based on the molecular weight of the Kraton A polymer. Optical properties such as haze and transmission were measured on injection molded disks at 0.125 inch thick according to ASTM D-1003. Melt flow rate is measured on dried compound pellets at 230 C/5 kg. Hardness is tested according to ASTM D2240 and tensile properties are measured according to ASTM D-412. See Table 2.

TABLE 2

| | Unit | SKM Blend B |
|---|---|---|
| Formulation | | |
| SIBSTAR 073T | | 33 |
| SIBSTAR 102T | | — |
| Kraton A1536 | | 100 |
| Kraton G1650 | | — |
| EDF 9498 | | — |
| Drakeol 34 | | 33 |
| Kemamide E | | 0.1 |
| AO330 | | — |
| Irgafos 168 | | — |
| Irganox 1010 | | 0.2 |

TABLE 2-continued

|  | Unit | SKM Blend B |
|---|---|---|
| DLTDP |  | 0.2 |
| Properties Measured |  |  |
| MFI |  |  |
| 230 C./5 kg | g/10 min | 50 |
| Physical Properties |  |  |
| Shore A Hardness | 10 s | 43 |
| Tensile Strength, MD | psi | 1440 |
| Tensile Strength, TD | psi | 1310 |
| Elongation, MD | % | 615 |
| Elongation, TD | % | 590 |
| 300% Modulus, MD | psi | 315 |
| 300% Modulus, TD | psi | 195 |
| Optical Properties |  |  |
| Light Transmission | % | 84 |
| Haze | % | 21 |

Example 3

Blends with Good Damping Behavior

The same SIBSTAR/Kraton A formulations described in Examples 1 and 2 unexpectedly demonstrate improved vibration damping and sound abatement behavior as demonstrated through dynamic mechanical analysis using techniques known to those skilled in the art. The ability for an elastic material to dissipate vibration is indicated by the magnitude and breadth of its tan delta response. Tan delta is the ratio of loss modulus vs storage modulus. Example formulations WF27-2, WF27-7, and Blend B all exhibit high tan delta values of ~1. This combined with a very broad tan delta response result in excellent vibration dissipation. Blends of SIBSTAR with traditional SEBS (Kraton G1650) as demonstrated by W27-5 have much lower tan delta magnitudes and dissipate vibration poorly.

Hybrar 7125 is a selectively hydrogenated SEEPS commercially available from Kuraray Co. Ltd. Hybrar 7125 is commonly used in the industry for elastic vibration damping and sound abatement applications. By comparison, the SIBSTAR/Kraton A blends have similar tan delta magnitude and increased breadth compared to Hybrar 7125 confirming their suitability for these types of applications. See Table 3.

TABLE 3

| DMA tan delta | Unit | WF27-2 | WF27-5 | WF27-7 | SKM Blend B | Hybrar 7125 |
|---|---|---|---|---|---|---|
| Peak Temp | °C. | −16 | −29 | 2 | −24 | 4.2 |
| Start Temp | °C. | −85 | −79 | −72 | −76 | −23 |
| End Temp | °C. | 59 | 44 | 47 | 46 | 69 |
| Magnitude | no unit | 0.94 | 0.68 | 1.04 | 1.1 | 1.08 |
| Breadth | °C. | 144 | 123 | 119 | 122 | 92 |

Example 4

Oil-Free Ternary Blends with Thermoplastics of Refractive Index about 1.53

Refractive index matching is a known technique to mix multiple polymeric materials in order to achieve a transparent product. Most traditional SEBS block copolymers have refractive indices below 1.51 which makes transparent blends with engineering thermoplastics difficult to achieve. Formulation WF27-4 and WF27-10 below demonstrate the ability to produce oil-free ternary blends of SIBSTAR/Kraton A/and Cyclic-olefin Copolymer (Topas 6013). Both formulations have relatively high light transmission and the addition of a decolorizer as demonstrated by WF27-10 can further reduce haze and improve transparency. The unexpected benefit of the ability to refractive index match allows transparent formulations to be made over a wide hardness range (depending on the amount of ETP) while improving upper service temperature performance of the SIBSTAR/Kraton A blend. See Table 4

TABLE 4

|  | Unit | WF27-4 | WF27-10 |
|---|---|---|---|
| Formulation |  |  |  |
| SIBSTAR 102T |  | 100 | 100 |
| A1536 |  | 100 | 100 |
| Topas 6013 |  | 100 | 50 |
| Clariant Decolorizer 6015 |  | — | 8 |
| AO330 |  | 0.1 | 0.1 |
| Irgafos 168 |  | 0.2 | 0.2 |
| Genox EP |  | 0.1 | 0.1 |
| Properties Measured |  |  |  |
| MFI |  |  |  |
| 230 C./5 kg | g/10 min | 4.7 | 4 |
| Physical Properties |  |  |  |
| Shore A Hardness | 10 s | 93 | 82 |
| Tensile Strength, MD | psi | 2620 | 2030 |
| Tensile Strength, TD | psi | 2520 | 1970 |
| Elongation, MD | % | 200 | 280 |
| Elongation, TD | % | 280 | 350 |
| Optical Properties |  |  |  |
| Light Transmission | % | 68 | 68 |
| Haze | % | 72 | 57 |

Example 5

Solvent Weldable Formulations

Formulations WF27-2, WF27-7, and WF27-10 described previously demonstrate the ability to be solvent welded via THF and Cyclohexanone which are solvents commonly used in the medical industry. Two injection molded samples of 0.5 inch width and 0.125 inch thickness were dipped into the respective solvent for 10 seconds to a depth of 1 inch. The 1 inch dipped areas were then over-lapped with each other and allowed to dry for 48 hours. Subsequent force to break the bond was measured in an electromechanical testing frame as recorded below in pounds-force. The three formulations below indicate that the formulations of the present invention exhibit good solvent welding characteristics. See Table 5.

TABLE 5

|  | Force to Break Bond (lbf) | |
|---|---|---|
| Formulation | THF | Cyclohexanone |
| WF27-2 | >23 | >23 |
| WF27-7 | >10 | >10 |
| WF27-10 | 45 | 34 |

Example 6

Consumer Steam Sterilizable Formulations

Suitability for consumer steam sterilization was evaluated by placing tensile specimens in a Quick Clean Micro-Steam Bag by Medela® with 2 ounces of water. Prior to sterilization the dimensions of the specimens were recorded. The tensile specimens were microwaved on high using a 1250 W Panasonic residential microwave for 2 minutes. The specimens were removed from the steam bag and allowed to cool for 30 minutes at which point the specimen dimensions were measured. Samples were then allowed to condition for 24 hours. Tensile measurements were then taken and the change in tensile strength and elongation due to microwave steam sterilization are shown below. Comparative example WF27-5 based on traditional SEBS demonstrated high levels of warpage, bowing, and shrinkage. WF27-2 and WF27-10 of the present invention demonstrated significantly lower levels of warpage, bowing, and shrinkage indicating unexpectedly superior performance. See Table 6.

TABLE 6

| Formulation | WF27-2 | Comparative WF27-5 | WF27-10 |
| --- | --- | --- | --- |
| Tensile Strength, MD % Change | −27 | −34 | −8 |
| Elongation, MD % Change | −2 | −15 | −7 |
| 300% Modulus, MD % Change | −12 | −5 | No value |
| % Shrinkage in Length | 6.1 | 6.9 | 0.3 |

Example 7

Formulations with Good Barrier Performance

In addition to SIBSTAR/Kraton A blends resulting in transparent, elastic formulations that can be modified with engineering thermoplastics, these blends also have unexpected low gaseous permeability coefficients as shown in the table below. A traditional formulation is illustrated by Kraton G2705 and is based on a selectively hydrogenated SEBS block copolymer. Kraton A1536 is a pure Kraton A polymer. Both have relatively high WVTR and $CO_2$ and $O_2$ permeability coefficients. The SIBSTAR/Kraton A blends of the present invention exhibit significantly lower transmission rates and permeability coefficients as shown by formulation WF27-2 at similar hardness. The combination of transparency with low $O_2$ permeability coefficients is important for gas impermeable sealants as an example. WF27-2 demonstrates a 75% reduction in the $O_2$ permeability coefficient compared to A1536 alone combined with excellent clarity as shown in Example 1. Addition of cyclic-olefin copolymer in WF27-4 further reduces the $O_2$ permeability coefficient by an additional 40% resulting in barrier properties similar to butyl rubber which has an $O_2$ permeability coefficient of 0.10 in the same units [Reference Polymer Handbook: S. Pauly "Permeability and Diffusion Data" in Polymer Handbook Third Edition Eds. J. Brandrup and E. H. Immergut, John Wiley & Sons, 1989, p. VI/442.]. See Table 7.

TABLE 7

| Sample | Water Vapor Transmission Rate | Carbon Dioxide Permeability Coefficient | Oxygen Permeability Coefficient | Hardness Shore A, 10s |
| --- | --- | --- | --- | --- |
| | 1E−12 (cc × cm)/(cm^2 × s × Pa) | | | |
| G2705 | 67.50 | 2.98 | 1.93 | 55 |
| A1536 | 50.67 | 3.87 | 0.91 | 65 |
| WF27-2 | 17.20 | 1.31 | 0.22 | 53 |
| WF27-4 | 10.49 | 0.63 | 0.13 | 93 |

Example 8

Formulation with Low Thermal Conductivity

Heat insulating applications require low thermal conductivity, as described in U.S. Pat. No. 6,910,507. Most of the materials used today are either rigid plastics containing hollow fillers or crosslinked, or partially crosslinked, rubbers which have complex manufacturing processes. Low thermal conductivity has been described as thermal conductivities measuring about 0.14 W/m*K. The thermal conductivities of the formulations in the present invention were measured on injection molded plaques according to ASTM C518. Surprisingly, the additional SIBSTAR to Kraton A significantly reduces the thermal conductivity into the range required for heat insulating applications. The benefit that Kraton A provides is the ability to tailor hardness of the SIBSTAR which is often too soft to be used independently in these types of applications. See Table 8.

TABLE 8

| Formulation | Apparent Thermal Conductivity (W/m * K) |
| --- | --- |
| Kraton G2705 | 0.167 |
| Kraton A1536 | 0.162 |
| WF27-2 | 0.143 |

Example 9

Liquid Polyisobutylene Extended Blends

The examples were prepared by combining Indopol H-100 with Kraton A1536 in different ratios. Indopol H-100 is a liquid polyisobutylene homopolymer available from INEOS Olefins & Polymers USA. The mixtures were shaken until the liquid polymer was fully absorbed by the A1536. SIBSTAR 103T-F was added in addition to the antioxidants and proprietary slip agent. The data produced below indicates that the viscosity of the final formulation can be altered dramatically by changing the amount of liquid polyisobutylene homopolymer. See Table 9.

TABLE 9

| Formulation | Units | WF29-8 | WF29-9 | WF29-10 |
| --- | --- | --- | --- | --- |
| DLTDP | | 0.22 | 0.22 | 0.22 |
| Irg 1010 | | 0.09 | 0.09 | 0.09 |
| Slip agent | | 1.3 | 1.3 | 1.3 |
| A1536H | | 44.20 | 39.20 | 34.20 |

TABLE 9-continued

| | Units | WF29-8 | WF29-9 | WF29-10 |
|---|---|---|---|---|
| SIBSTAR 103T-F | | 44.20 | 39.20 | 34.20 |
| Indopol H-100 | | 10.00 | 20.00 | 30.00 |
| Total | | 100.0 | 100.0 | 100.0 |
| MFR (230 C./5 kg) | g/10 min | 14.1 | 28.6 | 63.9 |
| Hardness, 30 s | Shore A | | 39 | |
| Compression Set | | | | |
| 23 C./22 hrs | % | | | 15.1 |

Example 10

Blends with Various Polyolefins

Blends of SIBSTAR, various controlled distribution Kraton A polymers (A1535, A1536, and Polymer 2, and various polyolefins (PP H20H-00, PP 5D49, and DMDA8007) were prepared by blending the components similarly to the method described in Example 1. Irganox 1010 and Irganox PS800 were used in addition to a slip agent. Additional SEBS polymers such as G1633 can also be incorporated into the formulations as in WF29-11, WF29-12, and WF29-13. WF29-12 also contains Polymer 2 which is an (S-EB/s)nX controlled distribution block copolymer that also contains an EB/s tailored softening modifier which has been described in U.S. Pat. No. 7,582,702 as Blend #10. PP H20H-00 is a 20 MFR homopolymer polypropylene available from INEOS olefins & Polymers USA. PP 5D49 is a 38 MFR homopolymer polypropylene from Dow Chemical Company. DMDA8007 is an 8.3 MI high density polyethylene from Dow Chemical Company.

The data produced in Table 10 indicates that a variety of polyolefins can be combined with SIBSTAR/Kraton A blends to generate formulations with hardness between 55 to 75 Shore A and viscosities suitable for a wide range of processes (measured by capillary rheometry at 200° C shown in the Drawing).

Example 11

High Strength Extrusion Cast Films

Blends of SIBSTAR and controlled distribution Kraton A1536 in addition to Drakeol 34 or Oppera PR100 were prepared similar to the procedures outlined in Example 2 and 1, respectively. Oppera PR100 is a hydrogenated hydrocarbon resins having a softening point of about 138° C. available from ExxonMobil Chemical Company.

The data produced below demonstrates the utility of such formulations in high strength elastic applications such as elastic film or fiber constructions. See Table 11.

TABLE 11

| | KIC-10-047 | | KIC-10-048 | |
|---|---|---|---|---|
| Formulation | | | | |
| A1536 | 60.1 | | 60.1 | |
| Sibstar 103T-F | 19.8 | | 19.8 | |
| Drakeol 34 | 19.8 | | | |
| Oppera PR100 | | | 19.8 | |
| Crodamide ER | 0.06 | | 0.06 | |
| Irganox 1010 | 0.12 | | 0.12 | |
| Total | 100 | | 100 | |
| MFR 230 C./2.16 kg, g/10 min | 10.9 | | 4.7 | |
| | MD | TD | MD | TD |
| Tensile | | | | |
| Thickness, in | 0.0038 | 0.0034 | 0.003 | 0.003 |
| 50% Modulus, psi | 132 | 83 | 192 | 92 |
| 100% Modulus, psi | 165 | 102 | 244 | 116 |
| 300% Modulus, psi | 338 | 180 | 493 | 226 |
| 500% Modulus, psi | 723 | 349 | 1118 | 510 |
| Max Stress, psi | 3581 | 3646 | 4457 | 3299 |
| Strain @ Break, % | 870 | 1009 | 717 | 763 |
| 300% Hysteresis | | | | |
| Cycle 1 Percent Set, % | 16.4 | 15.2 | 23 | 18.3 |
| Cycle 1 Recovered | 67.2 | 81.4 | 49.5 | 71.9 |

TABLE 10

| Formulation | Units | WF29-5 | WF29-6 | WF29-11 | WF29-12 | WF29-13 |
|---|---|---|---|---|---|---|
| Irganox PS800 | | 0.22 | 0.22 | 0.22 | 0.22 | 0.22 |
| Irganox 1010 | | 0.09 | 0.09 | 0.09 | 0.09 | 0.09 |
| Slip agent | | 1.3 | 1.3 | 1.3 | 1.3 | 1.3 |
| PP H20H-00 | | | | 15.40 | 15.40 | |
| PP 5D49 | | | | | | 15.40 |
| DMDA8007 | | 15.40 | 15.40 | | | |
| Kraton A1535H | | 20.70 | 20.75 | | | |
| Kraton A1536H | | 20.80 | 41.50 | 15.00 | | 15.00 |
| SIBSTAR 103T-F | | 41.50 | 20.75 | 33.00 | 33.00 | 33.00 |
| Indopol H-100 | | | | 20.00 | | 20.00 |
| Kraton G1633 | | | | 15.00 | 15.00 | 15.00 |
| Polymer 2 | | | | | 35.00 | |
| Total | | 100.0 | 100.0 | 100.0 | 100.0 | 100.0 |
| Hardness, 30 s | Shore A | 74.0 | 75.2 | 60 | 63 | 58 |
| Compression Set | | | | | | |
| 23 C/22 hrs | % | 25.9 | 20.5 | 22 | 17 | 21 |

TABLE 11-continued

| Energy, % | | | | |
|---|---|---|---|---|
| Cycle 2 Percent Set, % | 17.2 | 17 | 24.5 | 20.2 |
| Cycle 2 Recovered Energy, % | 91.4 | 92.6 | 85.2 | 86.3 |
| 100% Hysteresis | | | | |
| Cycle 1 Percent Set, % | 6 | 6.3 | 9.7 | 9.3 |
| Cycle 1 Recovered Energy, % | 80.2 | 86.4 | 64.3 | 81.1 |
| Cycle 2 Percent Set, % | 6.7 | 7.2 | 10.6 | 10.2 |
| Cycle 2 Recovered Energy, % | 93 | 93 | 86.3 | 88.4 |

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A block copolymer composition comprising:
(1) a hydrogenated block copolymer that has at least one block A and at least one block B, and wherein:
   a. prior to hydrogenation each A block is a mono alkenyl arene homopolymer block and each B block is a controlled distribution copolymer block of at least one conjugated diene and at least one mono alkenyl arene;
   b. subsequent to hydrogenation about 0-10% of the arene double bonds have been reduced, and at least about 90% of the conjugated diene double bonds have been reduced;
   c. each A block having a number average molecular weight between about 3,000 and about 60,000 and each B block having a number average molecular weight between about 30,000 and about 300,000;
   d. each B block comprises terminal regions adjacent to the A blocks that are rich in conjugated diene units and one or more regions not adjacent to the A blocks that are rich in mono alkenyl arene units;
   e. the total amount of mono alkenyl arene in the hydrogenated block copolymer is about 20 percent weight to about 80 percent weight; and
   f. the weight percent of mono alkenyl arene in each B block is between about 10 percent and about 75 percent,
(2) about 10 to about 90 percent by weight of a styrene-isobutylene-styrene block copolymer; and
(3) optionally about 0 to about 40 percent by weight of an extender oil or tackifying resin wherein the total wt. % of the composition is 100 wt. %, wherein the composition has a light transmittance between about 70 to about 90% transmission, including all points in-between, according to ASTM D1003, and a haze between about 5 to about 50%, including all points in-between, according to ASTM D1003, and a tan delta value of the range from about 0.8 to about 1.5.

2. The composition according to claim 1, wherein the mono alkenyl arene is styrene.

3. The composition according to claim 1, wherein the conjugated diene is selected from the group consisting of butadiene and isoprene.

4. The composition according to claim 1, further comprising a tan delta value in the range of from about 0.80 to about 1.5.

5. The composition according to claim 1, further comprising an extender oil or tackifying resin in an amount between about 5 to about 40 weight percent.

6. The composition according to claim 1, further comprising between about 2 to about 40 weight percent of a cyclic-olefin copolymer.

7. The composition according to claim 1 wherein said total controlled distribution block copolymer contains about 30 to about 80 percent total styrene content.

8. The composition according to claim 1, further comprising between about 2 to about 40 phr of a cyclic-olefin copolymer and having a Shore A hardness greater than 80 according to ASTM D2240.

9. The composition according to claim 1, further comprising a Shore A hardness between about 20 to about 95 according to ASTM D2240.

10. The composition according to claim 1, wherein the melt index is from about 1 to about 100 grams/10 minutes according to ASTM D1238 at 230° C. and 5 Kg weight.

11. The composition according to claim 1, further comprising an apparent thermal conductivity of about 0.14 W/m*K according to ASTM C518.

12. The composition according to claim 1, wherein the mono alkenyl arene is styrene and the conjugated diene is selected from the group consisting of butadiene and isoprene.

13. The composition according to claim 1, wherein each B block contains between about 5 wt % to about 10 wt % of a functionalized monomer.

14. The composition according to claim 1, wherein the melt index is from about 1 to about 100 grams/10 minutes according to ASTM D1238 at 230° C. and 5 Kg weight.

15. The composition according to claim 1, wherein a Shore A hardness between about 20 to about 70, and a haze between about 10 to about 50% according to ASTM D1003.

16. The composition according to claim 1, further comprising between about 0 to about 0.5 weight percent of an antioxidant.

17. The composition according to claim 1, further comprising between about 0 to about 5 weight percent of a slip agent.

18. The composition according to claim 1, further comprising between about 0 to about 5 weight percent of a decolorizer.

19. The composition according to claim 1, further comprising between about 0 to about 5 weight percent of a blowing agent.

20. A block copolymer composition comprising:
(1) a. a hydrogenated block copolymer that has at least one block A and at least one block B, and wherein:
   b. prior to hydrogenation each A block is a mono alkenyl arene homopolymer block and each B block is a controlled distribution copolymer block of at least one conjugated diene and at least one mono alkenyl arene;
   c. subsequent to hydrogenation about 0-10% of the arene double bonds have been reduced, and at least about 90% of the conjugated diene double bonds have been reduced;
   d. each A block having a number average molecular weight between about 3,000 and about 60,000 and each B block having a number average molecular weight between about 30,000 and about 300,000;
   e. each B block comprises terminal regions adjacent to the A blocks that are rich in conjugated diene units and one or more regions not adjacent to the A blocks that are rich in mono alkenyl arene units;
   f. the total amount of mono alkenyl arene in the hydrogenated block copolymer is about 20 percent weight to about 50 percent weight;

(2) about 10 to about 90 percent by weight of an styrene-isobutylene-styrene block copolymer; and (3) about 2 to about 40 percent by weight of an engineering thermoplastic, wherein the composition has a light transmittance between about 70 to about 90% transmission, including all points in-between, according to ASTM D1003, and a haze between about 5 to about 50%, including all points in-between, according to ASTM D1003, and a tan delta value of the range from about 0.8 to about 1.5.

21. The composition according to claim 20, further comprising a Shore A hardness greater than 50 according to ASTM D2240.

22. The composition according to claim 20, further comprising a melt index from about 1 to about 100 grams/10 minutes according to ASTM D1238 at 230° C. and 5 Kg weight.

23. The composition according to claim 20, further comprising a carbon dioxide permeability coefficient of less than $3+10^{-12}$ (ccxcm)/(cm$^2$xsxPa) as measured at 23° C. and 0% relative humidity with 100% $O_2$ test gas concentration and 760 mmHg test gas pressure.

24. The composition according to claim 20, further comprising an oxygen permeability coefficient of about 0.1 to about $0.9+10^{-12}$ (ccxcm)/(cm$^2$xsxPa) as measured at 23° C. and 0% relative humidity with 100% $O_2$ test gas concentration and 760 mmHg test gas pressure.

25. A block copolymer composition comprising:
(1) a hydrogenated block copolymer that has at least one block A and at least one block B, and wherein:
 a. prior to hydrogenation each A block is a mono alkenyl arene homopolymer block and each B block is a controlled distribution copolymer block of at least one conjugated diene and at least one mono alkenyl arene;
 b. subsequent to hydrogenation about 0-10% of the arene double bonds have been reduced, and at least about 90% of the conjugated diene double bonds have been reduced;
 c. each A block having a number average molecular weight between about 3,000 and about 60,000 and each B block having a number average molecular weight between about 30,000 and about 300,000;
 d. each B block comprises terminal regions adjacent to the A blocks that are rich in conjugated diene units and one or more regions not adjacent to the A blocks that are rich in mono alkenyl arene units;
 e. the total amount of mono alkenyl arene in the hydrogenated block copolymer is about 20 percent weight to about 80 percent weight; and
 f. the weight percent of mono alkenyl arene in each B block is between about 10 percent and about 75 percent;

(2) about 10 to about 90 percent by weight of an styrene-isobutylene-styrene block copolymer;

(3) about 0 to about 40 percent by weight of an oil; and (4) about 5 to about 30 percent by weight of a polyolefin or styrenic resin, wherein the composition has an oxygen permeability coefficient $<0.9+10^{-12}$ (ccxcm)/(cm$^2$xsxPa) as measured at 23° C. and 0% relative humidity with 100% O2 test gas concentration and 760mmHg test gas pressure, and a tan delta value of the range from about 0.8 to about 1.5.

26. The composition according to claim 25, further comprising between about 0 to about 5 weight percent of a slip agent.

27. The composition according to claim 25, further comprising an extender oil in an amount between about 5 to about 40 weight percent.

\* \* \* \* \*

UNITED STATES PATENT AND TRADEMARK OFFICE
CERTIFICATE OF CORRECTION

| | |
|---|---|
| PATENT NO. | : 8,299,177 B2 |
| APPLICATION NO. | : 13/009557 |
| DATED | : October 30, 2012 |
| INVENTOR(S) | : Kathryn J. Wright et al. |

It is certified that error appears in the above-identified patent and that said Letters Patent is hereby corrected as shown below:

Title Page, (73) after Assignee: delete "Kranton" and insert --Kraton--.

Signed and Sealed this
Twenty-ninth Day of October, 2013

Teresa Stanek Rea
*Deputy Director of the United States Patent and Trademark Office*